(12) United States Patent
Romatz

(10) Patent No.: US 11,324,353 B2
(45) Date of Patent: May 10, 2022

(54) BLENDER ATTACHMENT SEPARATOR

(71) Applicant: Susana Lauren Romatz, Eugene, OR (US)

(72) Inventor: Susana Lauren Romatz, Eugene, OR (US)

(73) Assignee: Susana Romatz, Eugene, OR (US)

( * ) Notice: Subject to any disclaimer, the term of this patent is extended or adjusted under 35 U.S.C. 154(b) by 177 days.

(21) Appl. No.: 16/699,491

(22) Filed: Nov. 29, 2019

(65) Prior Publication Data

US 2020/0178734 A1    Jun. 11, 2020

Related U.S. Application Data

(60) Provisional application No. 62/777,097, filed on Dec. 8, 2018.

(51) Int. Cl.
| | |
|---|---|
| *A47J 19/02* | (2006.01) |
| *A47J 36/20* | (2006.01) |
| *A23N 1/02* | (2006.01) |
| *A47J 43/07* | (2006.01) |
| *A23L 2/04* | (2006.01) |

(52) U.S. Cl.
CPC .............. *A47J 19/027* (2013.01); *A23L 2/04* (2013.01); *A23N 1/02* (2013.01); *A47J 36/20* (2013.01); *A47J 43/0716* (2013.01); *A23V 2002/00* (2013.01)

(58) Field of Classification Search
CPC ...... A47J 19/027; A47J 36/20; A47J 43/0716; A23L 2/04; A23N 1/00; A23N 1/02; A23V 2002/00
See application file for complete search history.

(56) References Cited

U.S. PATENT DOCUMENTS

| | | | | |
|---|---|---|---|---|
| 3,101,107 | A * | 8/1963 | Posener | A47J 19/023 99/503 |
| 4,506,601 | A * | 3/1985 | Ramirez | A47J 19/027 99/511 |
| 5,222,430 | A * | 6/1993 | Wang | A47J 19/023 99/512 |
| 5,662,032 | A * | 9/1997 | Baratta | A47J 43/046 210/380.1 |
| 6,050,180 | A * | 4/2000 | Moline | A47J 19/027 241/37.5 |
| 2016/0255983 | A1 * | 9/2016 | Barquin | A47J 19/06 |
| 2018/0014695 | A1 * | 1/2018 | Gross | A47J 43/0716 |

* cited by examiner

*Primary Examiner* — Ryan A Reis

(57) ABSTRACT

A separator and two methods of separating are described. The separator can include a driver configured for use with a blender, a perforated spindle cup arm, a threaded pass through retainer ring, a mount ring configured to fit a blender base, a lubricated ball bearing, a retainer nut, a mount ring, a housing, a perforated spindle cup, a liquid chute, a basin for liquid collection, a reservoir for dry material collection, a snap ring, a removable cap, a chute for expelling dry material, a hole, and a removable funnel. The method can include grinding material in blender container; placing the separator on the blender base, turning the blender on, and pouring the ground material into the funnel OR placing the peeler component into the cup, turning the blender on, and pouring water and material to be peeled through the funnel.

4 Claims, 10 Drawing Sheets

107

103

101

At 601 user engages blender with blender motor and places materials to be separated in blender container with liquid. User grinds materials to be separated in blender with liquid and sets it aside.

At 602 user places the separator attachment 100 onto the blender motor. The drive gear 101 is configured to engage with the blender base, allowing multiple uses for one appliance motor.

At 603 the drive gear 101 engages as the motor is powered on and spins the perforated cup 110.

At 604 the user pours the material/liquid slurry from the blender container into the input funnel 116.

At 605 the perforated spindle cup 110 spinning at high speed allows for a strong centrifugal force to push the liquid out through the perforation and down the liquid output chute 104.

At 606 the shape of the perforated spindle cup 110 and the spinning at high speed allows remaining dry material to be flung out over the edge of the perforated cup 110 and out the dry chute 115.

At 607 liquid and dry material is collected for possible further use.

FIG. 6

At 901 user engages separator attachment 100 onto blender base. The drive gear 101, is configured to engage with the blender base, allowing multiple uses for one appliance motor.

↓

At 902 user removes cap 114 and places peeler component 117 into perforated spindle cup 110.

↓

At 903 user adds material to be peeled into the perforated spindle cup 110 with added peeler component 117.

↓

At 904 user replaces cap 114, turns blender on, drive gear 101 engages with blender base causing perforated spindle cup 110 to spin, and user adds water to funnel 116.

↓

At 905 peeler separator component is configured to separate coverings from materials.

↓

At 906 the water will flow out the liquid output chute 104.

↓

At 907 the peels will be expelled through the dry output chute 115.

↓

At 908 the peeled material is removed for possible further use.

FIG. 9

BLENDER ATTACHMENT SEPARATOR

RELATED APPLICATIONS

This application claims the benefit of U.S. Provisional Application No. 62/777,097, entitled "Separator" filed on Dec. 8, 2018, which is incorporated herein by reference in its entirety.

FIELD

Embodiments relate generally to separators, and more particularly, to blender attachment separators.

BACKGROUND

More people are starting to purchase and make nut milks and other separated liquids. This can be time consuming and expensive, without the proper equipment. Breaking apart fibrous nuts, fruits, and vegetables may require a strong motor and blades. Separating the fibrous covers from fruits and nuts might be time consuming. Separating the proteins, sugars and fats from the fibers might be inconvenient, messy and difficult. There are machines available to assist in this process. There is a separator machine that utilizes its own motor system to separate. It is less convenient than a blender attachment because it requires the operator to own more than one machine (a separator and a blender), rather than having one motor machine with multiple functions. It is also a large and heavy machine, which might make it difficult for the user to operate or store. There are attachments that can be placed on a blender that separate liquids from solids, but these attachments don't a. use high speed centrifugal force to separate materials, b. expel the fiber in an attractive form for use in other applications, or c. allow for additional add on components that can assist in separating coverings from materials.

Some implementations were conceived in light of the above, among other things.

SUMMARY

Some implementations can include a separator blender attachment. The separator blender attachment can include a funnel to direct liquid into the separator, a removable cap, a dry/output chute for expelling fiber, a perforated spindle cup for the liquid to pass through, a wet/output liquid chute, a drive gear, and housing. Some implementations can include separating coverings from materials.

BRIEF DESCRIPTION OF THE DRAWINGS

FIG. 6 is a flowchart of an example method of example separator operation in accordance with some implementations.

FIG. 9 is flowchart of an example method of operation of a separator with peeler component added that can assist in separating coverings from materials in accordance with some implementations.

DETAILED DESCRIPTION

Figure 1:
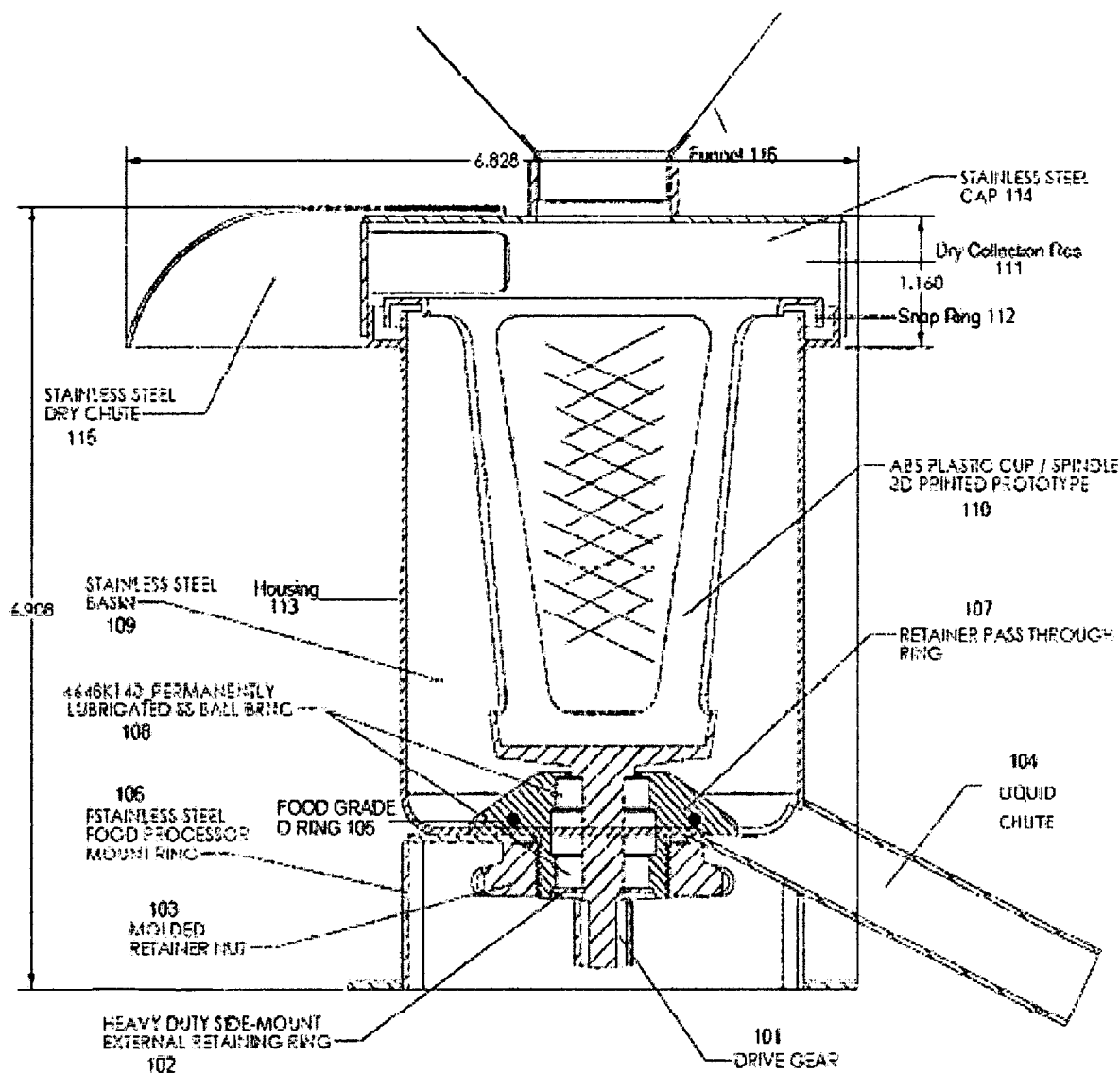
FIG. 1 is a diagram of example separator in accordance with some implementations.

FIG. 1 is a diagram of an example separator 100. The separator includes a drive gear 101, a side mount external retaining ring 102, a retainer nut (removable for cleaning) 103, a liquid output chute 104, a food grade rubber O ring 105, a mount ring 106, a retainer pass through ring 107, a ball bearing 108, a basin with upper reservoir and dam 109, a perforated spindle cup 110, a dry collection reservoir 111, a snap ring 112, housing 113, a removable cap 114, a dry output chute 115, and a input funnel 116.

Basic operation entails using the blender container to grind materials for separation with liquid and setting the container aside before placing the blender attachment 100 onto the blender base where the drive gear 101 is configured to engage with the blender base, allowing for multiple uses for one appliance motor. The blender is powered on, engaging the drive gear 101, which spins the perforated spindle cup 110. The user pours the pre-ground material for separation into the input funnel 116. The perforated spindle cup, spinning at high speed allows for a strong centrifugal force to force the liquid our through the perforation and down the liquid output chute 104. The shape of the perforated spindle cup 110 and the spinning at high speed allows remaining dry material to be flung out over the edge of the perforated spindle cup 110 and out the dry chute 115.

If user is using the attachment to remove coverings from materials, the separator attachment 100 is placed on the blender base and the drive gear 101 is configured to engage with the blender base. The peeler component 117 (see, e.g., FIG. 8) is placed into the perforated spindle cup 110. The user adds materials to have covering removed into the perforated spindle cup 110 with the added peeler component 117. The blender is powered on and the drive gear 101 turns the perforated spindle cup 110 with the peeler component 1174 added. The user adds water to the funnel 116 and the peeler separator component is configured to separate coverings from materials. The water will flow out the liquid chute at 104 and the peels may be expelled through the dry output chute at 115. Once coverings are removed from material, material is removed from the perforated spindle cup for further use.

Figure 2A:
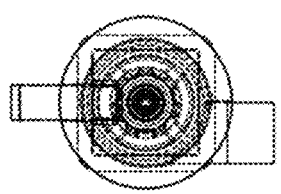
FIG. 2A-2D are diagrams of an example separator from various sides in accordance with some implementations.

FIG. 2A is a diagram of an example separator top view.

Figure 2B:
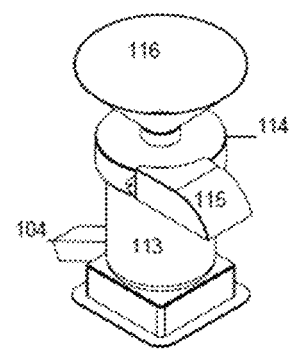

FIG. 2B is a diagram of an example separator side top view.

Figure 2C:
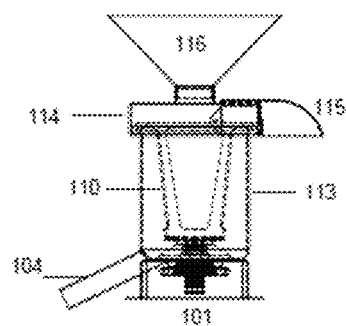

FIG. 2C is a diagram of an example separator cross section.

Figure 2D:
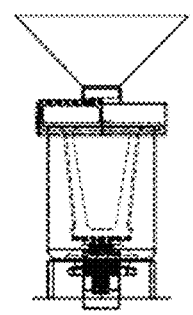

FIG. 2D is a diagram of an example separator cross section.

Figure 3:
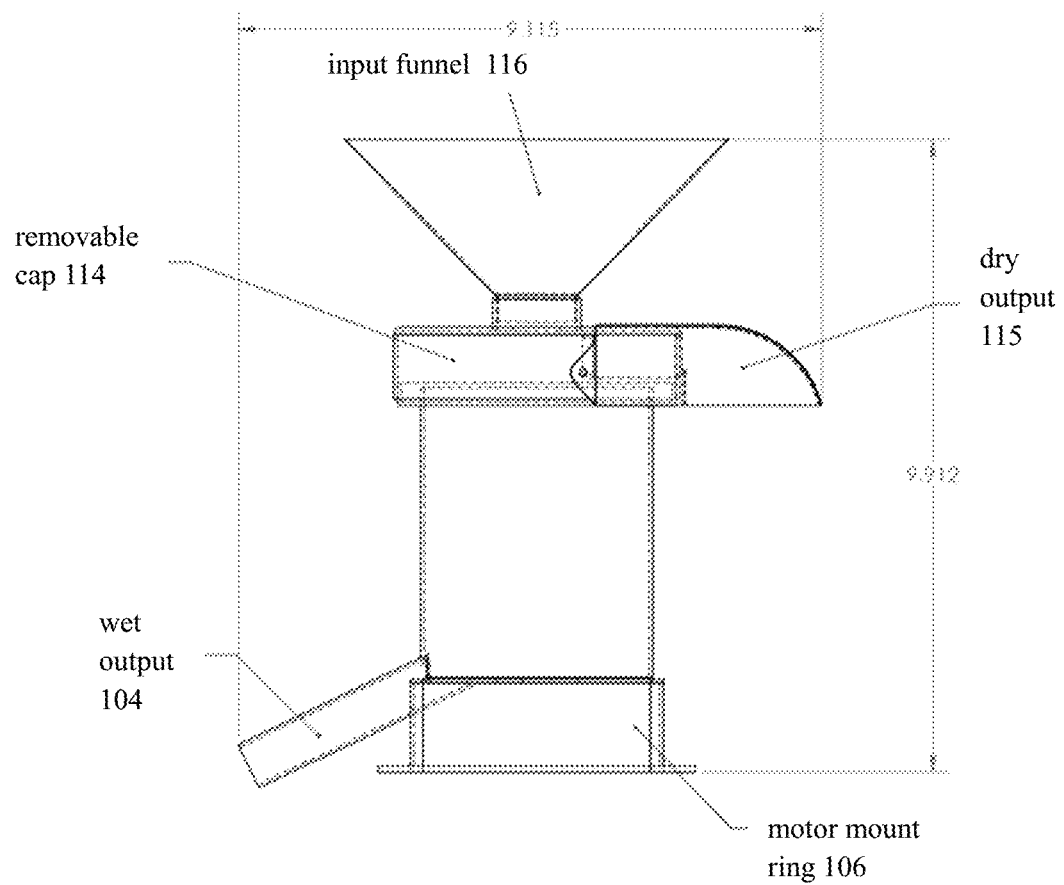
FIG. 3 is a diagram of an example separator mount, wet and dry chutes, removable cap, and removable funnel in accordance with some implementations.

FIG. 3 is a diagram of an example separator mount, wet and dry chutes, removable cap, and removable funnel.

Figures 4A, 4B:
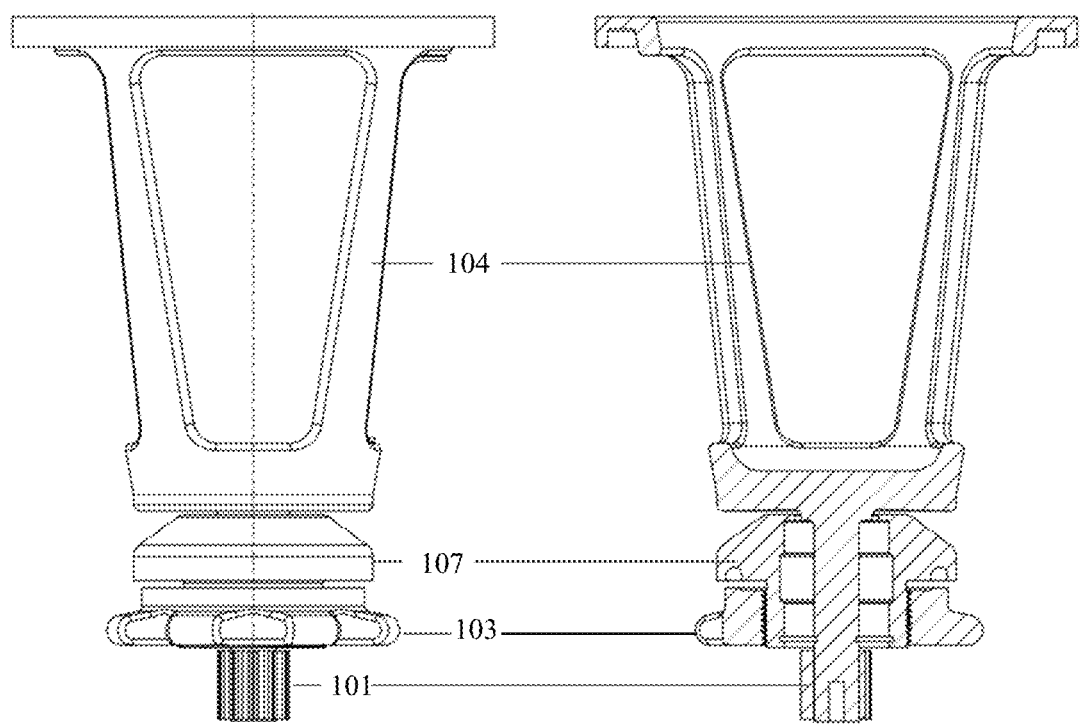
FIG. 4A is a diagram of an example separator drive gear, retaining ring, retainer nut, retainer pass through ring, and perforated spindle cup in accordance with some implementations.
FIG. 4B is a cross-section diagram of an example separator drive gear, retaining ring, retainer nut, retainer pass through ring, and perforated spindle cup in accordance with some implementations.

FIG. 4 is a diagram of an example separator drive gear, retaining ring, retainer nut, retainer pass through ring, and perforated spindle cup.

Figure 5A:
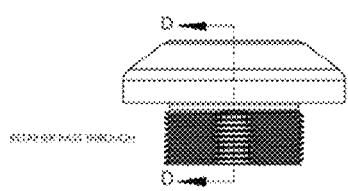
FIG. 5A-5I are diagrams of an example separator drive gear, retainer nut, and retainer pass through ring from various sides in accordance with some implementations.

FIG. 5A is a diagram of an example separator drive gear.

Figure 5B:
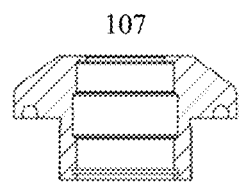

FIG. 5B is a diagram of an example separator drive gear cross section.

Figure 5C:
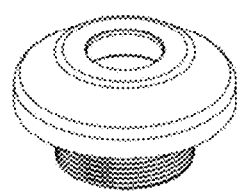

FIG. 5C is a diagram of an example separator drive gear top view.

Figure 5D:
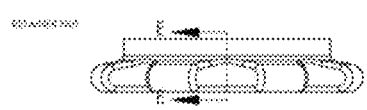

FIG. 5D is a diagram of an example retainer nut.

Figure 5E:
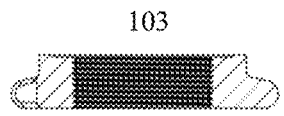

FIG. 5E is a diagram of an example retainer nut cross section.

Figure 5F:
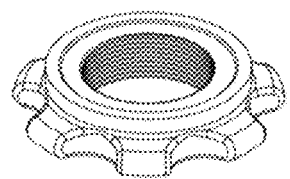

FIG. 5F is a diagram of an example retainer nut top view.

Figure 5G:

FIG. 5G is a diagram of an example drive gear

Figure 5H:

FIG. 5H is a diagram of an example drive gear cross section.

Figure 5I:

FIG. 5I is a diagram of an example drive gear top view.

FIG. 6 is a flowchart of an example method of separating in accordance with some implementations. The method begins at 601 and continues to 602.

The user grinds up the material to be separated with liquid using the blender and sets it aside at 601.

The user places the separator attachment 100 onto the blender motor. The drive gear 101 is configured to engage with the blender base at 602.

The drive gear 101 engages as the motor is powered on and spins the cup 110 at high speed, allowing for centrifugal force to separate material from liquid at 603.

At 604, the user pours the material/liquid slurry into the input funnel 116.

At 605, the perforated spindle cup 110 spinning at high speed allows for a strong centrifugal force to push the liquid out through the perforation and down the liquid output chute 104.

At 606, the shape of the perforated spindle cup 110 and the spinning at high speed allows remaining dry material to be flung our over the edge of the perforated spindle cup 110 and out the dry chute 115.

At 607, liquid and dry material is collected for possible further use.

Figure 7:
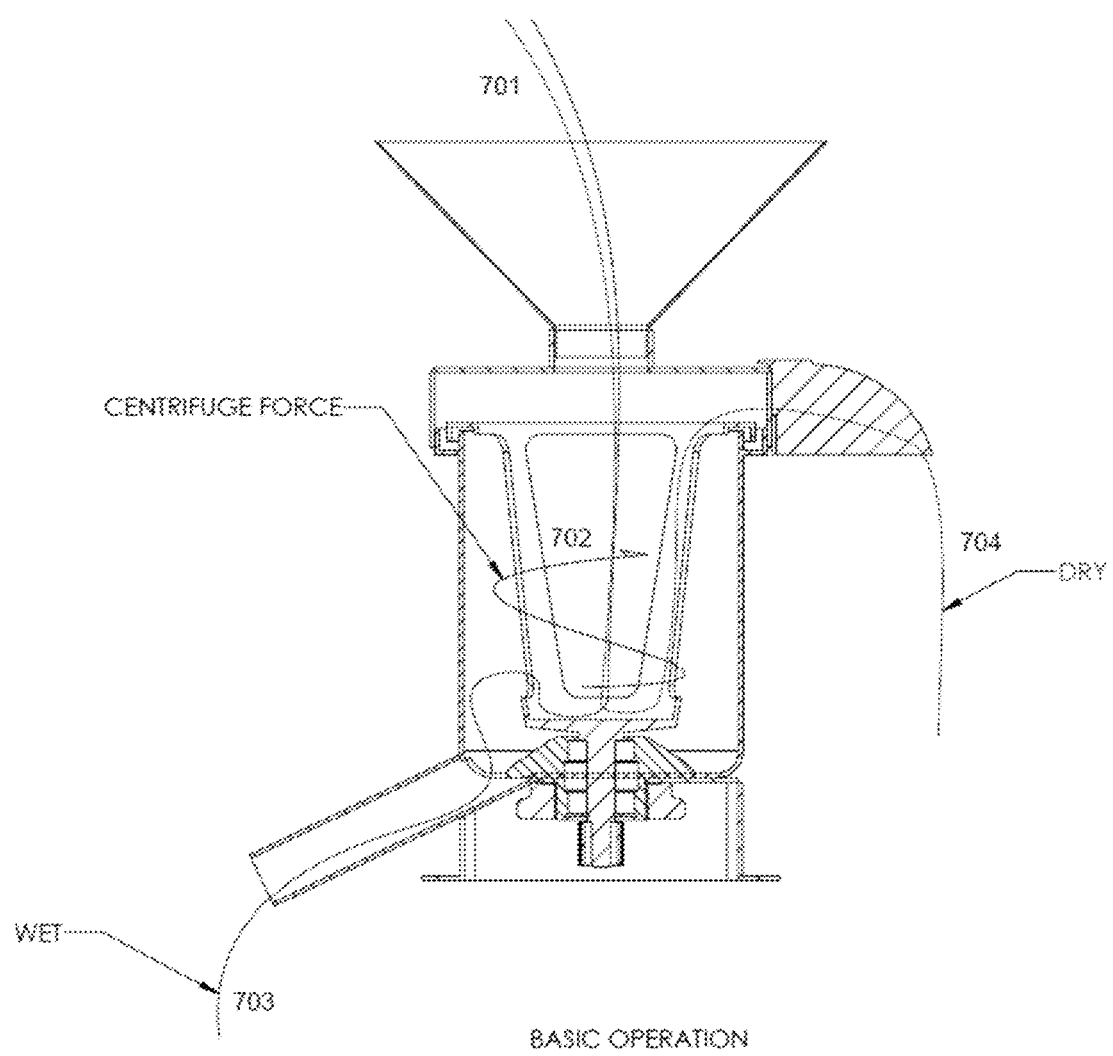
FIG. 7 is a diagram of an example separator in accordance with some implementations.

FIG. 7 is a diagram of an example method of example separator in accordance with some implementations.

At 701 pre-ground slurry material is poured through the funnel 116. Liquid slurry enters the perforated spindle cup 110.

At 702 high speed centrifugal force pushes liquid out through the perforation.

At 703 separated liquid flows out the liquid chute 104.

At 704 dry material is flung out of the perforated spindle cup 110 and out the dry chute 115.

Figure 8:
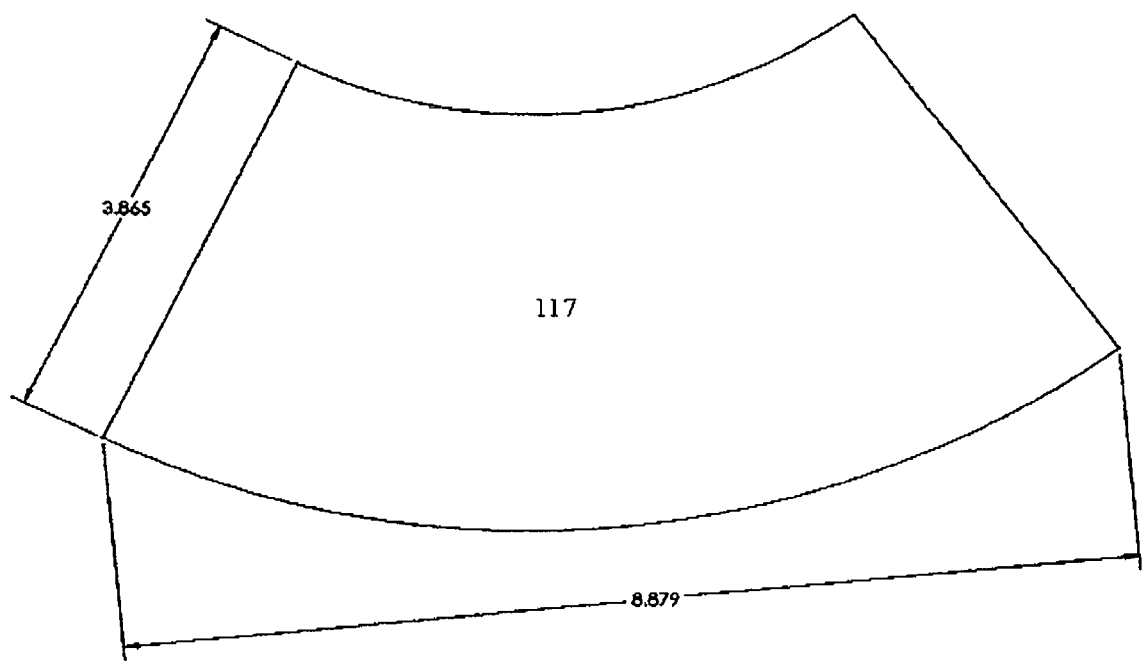
FIG. 8 is a diagram of example separator peeling component that can assist in separating coverings from materials in accordance with some implementations.

FIG. 8 is a diagram of an example separator peeling component 117 that can assist in separating coverings from materials in accordance with some implementations.

FIG. 9 is a flowchart of an example method of peeling component. The method begins at 901 and continues to 902.

At 901 add the separator attachment 100 onto the blender base. The drive gear 101 is configured to engage with the blender base, allowing multiple uses for one appliance motor.

At 902 user removes cap 114 and places peeler component 117 into perforated spindle cup 110.

At 903 user adds material to be peeled into the perforated spindle cup 110 with added peeler component 117.

At 904 user replaces cap 114, turns blender on, drive gear 101 engages with blender motor causing perforated spindle cup to spin, and adds water to funnel 116.

At 905 peeler separator component is configured to separate coverings from materials.

At 906 water will flow out the liquid output chute 104.

At 907 the peels may be expelled through the dry output chute.

At 908 the peeled material is removed for further possible use.

Figure 10:
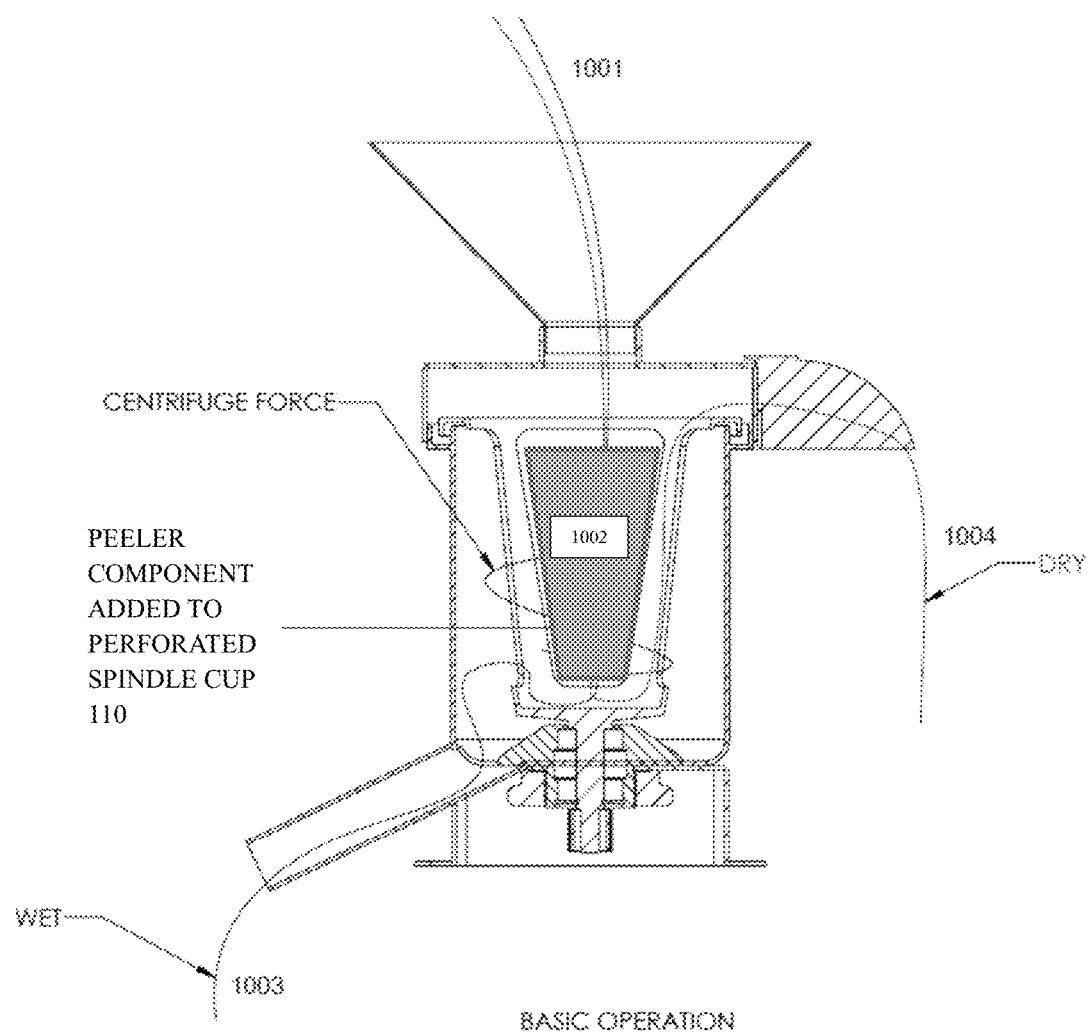
FIG. 10 is a diagram of an example method of example separator peeling component added in accordance with some implementations.

FIG. 10 is a diagram of an example method of example separator peeling component added in accordance with some implementations.

The textured peeler component 108 is added to the perforated spindle cup 110. At 1001 dry material to have coverings removed is added through the funnel 116 with water.

At 1002 the peeler component is configured to remove coverings from added materials.

At 1003 water will exit through the liquid chute 104.

At 1004 coverings from materials may exit the dry chute 115.

It is, therefore, apparent that there is provided, in accordance with the various embodiments disclosed herein, a separator and a method of separating materials.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A separator attachment comprising:
a drive gear configured for use with a blender;
a perforated spindle cup arm connected to the driver, the perforated spindle cup arm configured to thread through a threaded pass through retainer ring which houses a lubricated ball bearing and connects to a perforated spindle cup, wherein the threaded pass through retainer ring is housed by a mount ring configured to fit a motorized base of the blender and house the threaded pass through retainer ring;
a retainer nut configured to hold the threaded pass through retainer ring, the lubricated ball bearing, the perforated spindle cup arm, and the driver in place onto a housing, wherein the housing houses the perforated spindle cup, wherein the perforated spindle cup includes a frame and at least one perforated opening section;
a liquid chute having a basin for liquid collection;
a reservoir for dry material collection;
a snap ring for removal of a removable cap;
a chute for expelling dry material; and
a hole which houses a removable funnel,
wherein the perforated spindle cup is configured to couple to the motorized base of the blender via the mount ring, the drive gear, and the perforated spindle cup arm,
wherein the separator attachment is configured to process pre-ground material does not include a comminuting element; and
wherein the motorized base of the blender, when activated, causes the perforated spindle cup to rotate.

2. The separator attachment of claim 1, further comprising a peeler component including:
a textured, flexible sheet configured to fit into the perforated spindle cup.

3. A method of separating materials, the method comprising:
- providing a separator that has a drive gear, housing, liquid output chute, perforated spindle cup, dry output chute, a cap, a peeler component and a removable funnel;
- grinding material in a blender container coupled to a motorized base of a blender to yield ground material;
- removing the blender container;
- placing the separator on the motorized base of the blender;
- turning the motorized base of the blender on;
- pouring the ground material into the removable funnel of the separator;
- processing the ground material through the perforated spindle cup, wherein the perforated spindle cup includes a frame and at least one perforated opening section;
- collecting liquid in a first container; and
- collecting pulp in a second container.

4. The method of claim 3, further comprising:
- placing a peeler component into the perforated spindle cup;
- turning the blender on;
- pouring water and material to be peeled through the removable funnel; and
- collecting peeled material.

\* \* \* \* \*